(12) United States Patent
Irvine

(10) Patent No.: US 7,393,482 B2
(45) Date of Patent: Jul. 1, 2008

(54) PROCESS FOR APPLYING SLEEVE TO POLE AND SLEEVED POLE

(75) Inventor: John E. Irvine, Atlanta, GA (US)

(73) Assignee: CMI Limited Company, Atlanta, GA (US)

( * ) Notice: Subject to any disclaimer, the term of this patent is extended or adjusted under 35 U.S.C. 154(b) by 358 days.

(21) Appl. No.: 10/891,930

(22) Filed: Jul. 15, 2004

(65) Prior Publication Data

US 2006/0013978 A1    Jan. 19, 2006

(51) Int. Cl.
*B29C 47/92*    (2006.01)
(52) U.S. Cl. ............... 264/40.7; 264/40.1; 264/167; 425/141
(58) Field of Classification Search ............ 264/167; 425/141
See application file for complete search history.

(56) References Cited

U.S. PATENT DOCUMENTS 4,584,150 A * 4/1986 Ballocca ............ 264/40.1
4,952,344 A * 8/1990 Burgess ............ 264/40.1
5,360,295 A   11/1994 Isacksen ........... 405/284
6,135,675 A   10/2000 Moreau ............ 405/284
2003/0017275 A1* 1/2003 Schick et al. ....... 427/421

OTHER PUBLICATIONS

NCEL Technical Note, N-1773, Timber Piling Barrier and Chemical Preservation Annual Costs Comparison, Jun. 1987, D. Pendleton and T. O'Neill, Navel Civil Engineering Laboratory Port Hueneme CA 93043.
NCEL Technical Note, N-1811, "Plastic Coatings and Wraps for New Marine Timber Piling," May 1990, David E. Pendleton, Naval Civil Engineering Laboratory Port Hueneme CA 93043-5003.

* cited by examiner

*Primary Examiner*—Monica A Huson
(74) *Attorney, Agent, or Firm*—Thomas, Kayden, Horstmeyer & Risley, LLP

(57) ABSTRACT

A plastic sleeve is applied to a pole of varying cross-sectional area. A series of poles are advanced along their lengths through the opening of an extruder die, plastic is extruded onto the pole to form a cylindrical sleeve, and the rate of advancement of the pole through the die is adjusted in accordance with the increasing or decreasing diameter of the pole, so as to assure an even application of the plastic about the pole. The ends of the plastic are gathered while the plastic is still hot, forming a closure of the plastic about the ends of the pole.

22 Claims, 2 Drawing Sheets

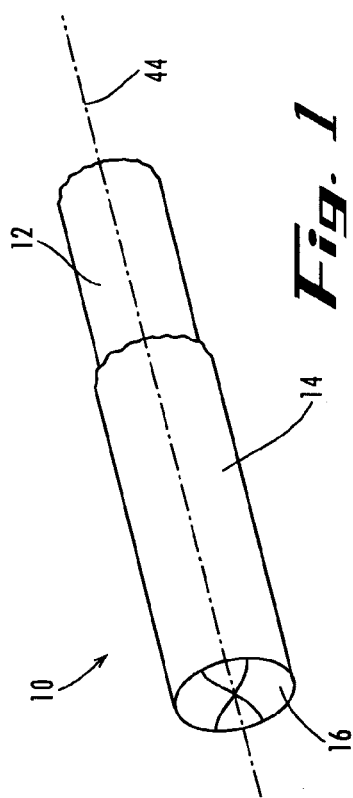
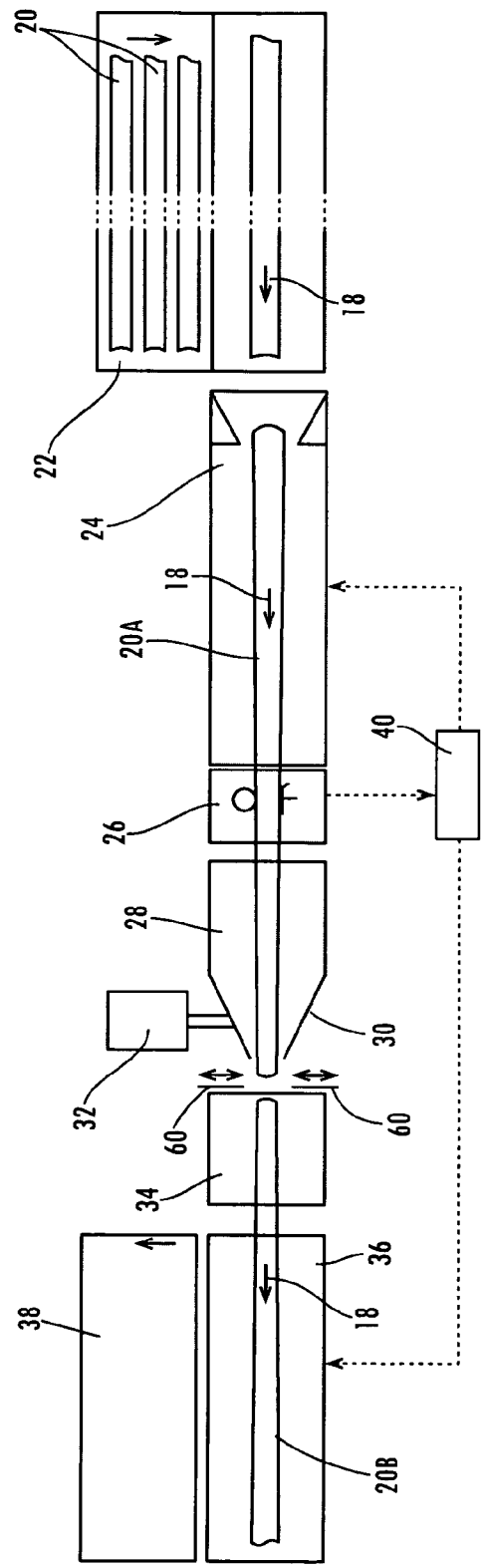

PROCESS FOR APPLYING SLEEVE TO POLE AND SLEEVED POLE

FIELD OF THE INVENTION

This invention concerns the application of a plastic sleeve to a pole, a timber or other large rectilinear object for the purpose of protecting it from deterioration from the environment and other conditions. Also, the invention comprises a pole, timber, or other elongated structural device that is surrounded by a protective sleeve, for use as a structural support in harsh environmental conditions.

BACKGROUND OF THE INVENTION

Poles, timbers and other elongated structures, herein after referred to as poles, that are made out of wood or other materials are commonly used as structural supports, and in many instances the poles are subjected to impact and abrasion from external sources and also subjected to severe atmospheric conditions that tend to deteriorate the poles, requiring replacement, repair, etc. For example, poles are used as piers that are partially embedded in the earth and are impacted by water craft and other floating objects, and are contacted by moving water, such as in rivers, lakes, oceans, etc., and are subject to temperature extremes The wood of the poles may also be subjected to deterioration from insect infestation and chemical contact.

In order to protect wooden poles from conditions as described above, chemicals are impregnated in or externally applied to the surfaces of the poles, by painting, pressure application, spraying, etc. The materials applied to the poles for preservative purposes can include chromated copper arsenic known as CCA, ACQ, and creosote. While these measures have extended the lives of wooden poles, the application of the preservatives increases the cost of the poles, and the poles still are directly exposed to deterioration over extended times of use.

It is understood in the art that providing a protective sleeve about a pole so that the sleeved pole can be successfully used for extended periods in harsh conditions would be highly desirable. However, the process of applying a protective sleeve to a large pole and similar very large objects is difficult and expensive, and the sleeve material is difficult to manage in the application procedure.

One of the complicating factors in applying sleeves to poles is that poles typically are made from timber, trees harvested from forests, and the natural shape of a tree is tapered, larger at the bottom and smaller at the top. Moreover, some trees are not exactly rectilinear and may have unexpected fat and thin areas about its length and knots where limbs have been removed. These shape characteristics of a typical tree complicate the process of applying a sleeve to the pole.

This invention is directed to an improved process for applying a protective sleeve to a pole formed from a tree and to other similarly shaped items, and to the product formed by the process.

SUMMARY OF THE INVENTION

Briefly described, the present invention comprises a process of applying a plastic sleeve to a pole of varying cross-sectional area. The process includes the steps of advancing a plurality of the substantially rectilinear poles of varying cross-sectional area along their lengths in series along a processing path. The poles are pushed through an opening of an extruder die. Plastic material is heated and fed at a substantially constant rate to the extruder die. The plastic is continuously applied through the opening of the extruder die about the exterior surface of each pole in series, as each pole moves through the extruder die, with the plastic progressively surrounding the pole.

In order to apply the plastic material in a substantially uniform thickness to a pole having a varying diameter, more plastic is required at the thicker portions of the pole than at the thinner portions of the pole. In order to achieve the uniform thickness application of the plastic, the thickness of each pole is progressively measured so that each portion of each pole is measured at a position displaced upstream of the extruder die. As the detected portion of the pole enters the extruder die, the rate of feeding the plastic material does not change, but the rate of advancement of the pole is adjusted in accordance with a change in the detected thickness of the pole. The rate of advancement of each pole is adjusted to correspond to the change in thickness of the detected portion of the pole passing through the extruder die so as to apply a uniform thickness of plastic in the sleeve about the poles.

More specifically, as a detected portion of a pole enters the extruder die, the rate of advancement of the pole is increased in response to the detected portion of the pole decreasing in thickness, and the rate of advancement of the pole is decreased in response to the detected portion of the pole increasing in thickness.

Another feature of the invention is the application of a negative air pressure between the plastic sleeve being applied to the pole and the pole itself, so as to draw the plastic sleeve into intimate contact with the pole. This assures that the plastic material of the sleeve is supported by the pole, the plastic tends to cling to the pole, and the thickness of the plastic is maintained substantially uniformly about the circumference and along the length of the pole.

Another preferred embodiment of the invention is that the poles are advanced in a continuing process, end to end, so that the extruding process is also continuously maintained with the sleeve of plastic extending from pole to pole. The segment of the sleeve extending between adjacent poles is severed, and the excess sleeve material is wrapped about the ends of the poles, thereby forming the sleeve into an envelope that envelopes the entire pole. The step of wrapping the plastic about the trailing and leading ends of the poles includes the application of an area of reduced pressure between the plastic and the trailing and leading ends of the adjacent poles such that the plastic being applied by the extruder die to the ends of the poles is induced to move about the ends of the poles.

Also, the step of wrapping the plastic about the ends of the pole can comprise a mechanical gathering of the plastic extending from adjacent poles.

Another aspect of the invention is the step of maintaining the longitudinal axis of the detected portion of the pole substantially coextensive with the longitudinal axis of the extruder die as the detected portion of the pole passes through the die.

The plastic material extruded into the sleeve about the pole may comprise polyvinyl chloride, polypropylene, and polyethylene, as well as several copolymers. The plastic material usually will be selected in anticipation of the end use of the pole.

A general concept is to capitalize on the beneficial properties of wood, such as strength, low cost, availability, and ease of use, and to eliminate the negative attributes by incorporating a plastic sleeve on the exterior of the wood. The plastic sleeve serves several purposes, including: it provides protection for the wood from the environment, creating a much longer life cycle: it protects people and the environment from the wood and any chemical preservatives in the wood; and the plastic coating provides an esthetic purpose in that it can be produced in various colors and it hides any knots and checks or other imperfections in the wood.

The plastic sleeve protects the wood from the environment in several ways. It protects from the ultraviolet light from the sun that can break down the fibers in the wood and cause a reduction in its structural strength. The sleeve reduces the amount of available oxygen at the surface of the wood and thereby reduces the ability of any insects or parasites to survive and destroy the wood.

Also, in a marine environment where the sleeved pole functions as a pile, the plastic sleeve serves as a barrier to marine borers that eat the wood. The sleeve has a smoother surface than the wood of the pole so the sleeve also reduces the potential damage from pile up-lift caused by ice in cold weather regions because the ice is not as likely to adhere to the plastic sleeve as well as it would adhere to the surface of the wood pole.

Also, the smooth exterior surface of the outer sleeve of the invention eliminates exposure to splinters in the surface of the wood. The sleeve also minimizes the possible transfer of chemical preservatives in the wood into the environment or into people's hands and skin. The amount of chemical preservatives required in certain applications of the poles may be reduced due to the additional protection provided by the plastic sleeve.

There are numerous applications for the work product, such as playground equipment, railroad ties, seawalls, retaining walls, pilings and other applications where longevity of the wood is a concern, safety of people or animals contacting the wood is a concern, or protection of the environment is a concern.

Thus, it is an object of this invention to provide an improved process for applying a plastic sleeve to a pole that may have a varying cross-sectional area along its length.

Another object of this invention is to provide a process for applying a plastic sleeve about a pole so that the plastic is in intimate contact with the surface of the pole and the thickness of the plastic sleeve is substantially uniform along the length of the pole.

Another object of this invention is to provide an improved sleeve-covered pole having a sleeve that protects the pole from harsh conditions occurring in the atmosphere and the surroundings of the pole.

Another object of this invention is to provide an improved process for applying a plastic sleeve to a large pole that is inexpensive, expedient and reliable.

Other objects, features, and advantages of the present invention will become apparent upon reading the following specification, when taken in conjunction with the accompanying drawings.

BRIEF DESCRIPTION OF THE DRAWINGS

FIG. 2 is a schematic diagram of the process of applying plastic sleeve material about a series of poles moving along a processing path.

FIG. 3 is another schematic, similar to FIG. 2, but showing more details of the process.

DETAILED DESCRIPTION

Figure 1:
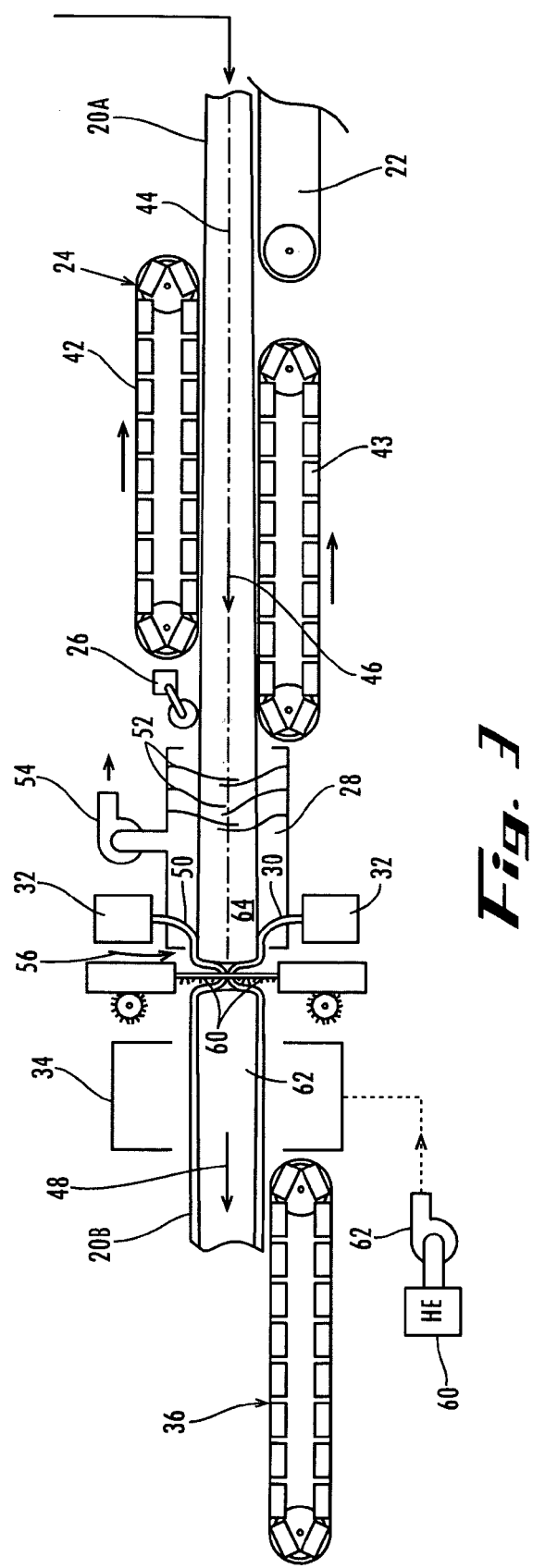
FIG. 1 is a partial perspective view of the end of a pole having a plastic sleeve applied thereto, with a portion of the sleeve removed to expose the pole.

Referring now in more detail to the drawings in which like numerals indicate like parts throughout the several views, FIG. 1 illustrates an end portion of a sleeved pole 10 that includes an end portion of a wooden pole 12, and a cylindrical plastic sleeve 14 surrounding the pole. The sleeve extends beyond the ends of the pole and is gathered about at its ends to envelope the pole and form a water tight barrier about the wooden pole, as shown at the gathered end portion 16. The wooden pole 12 typically is tapered along its length, usually having a big end and a small end, with the small end smaller in diameter than the big end. The pole also may have irregular shapes along its length.

The sleeve wrapped about the pole is substantially uniform in thickness, usually being between 0.01 inch and 2.0 inches in thickness for most uses; however thinner and thicker sleeves can be produced with the process. The sleeve is characterized by having been vacuum urged into intimate contact with the wooden pole. The wrapping of the plastic sleeve about the ends of the poles is performed when the end of one pole exits the extruder and a following pole closely follows, so that the hot plastic of the overhanging sleeve, when gathered together between the adjacent ends of the poles, tends to cling to itself and to the end of the pole, usually sealing the end of the pole from the atmosphere. Thus, the sleeve 14 of the sleeved pole 10 forms a substantially water-tight exterior envelope, shielding the pole 12 from the environment.

As illustrated in FIG. 2, the process of applying the sleeve to a pole starts with the provision of standard timbers or pilings 20 being loaded in parallel relationship onto an accumulator 22 that holds a sufficient number of the timbers so that they can be continually fed into the entry of the processing path. The processing path is indicated by the arrows 18. There is no limit to the sizes of the poles that can be handled by the system, except that the components of the system must be able to handle the weight and physical size of the poles. Preferably, the poles are placed in longitudinal alignment with one another along the processing path, with the adjacent ends of the poles being spaced apart about two to three feet.

The poles move in sequence from the accumulator feeder 22 into a entrance or pusher conveyor 24, through a speed and diameter sensor 26, through vacuum box 28 and extruder die 30 which receives molten plastic from extruder 32. As each pole, such as pole 20A, moves through the extruder die 30, the plastic is extruded in a circular configuration toward longitudinal axis of the pole, and the progress of the pole through the die tends to form the circular plastic into an elongated sleeve that extends about the pole.

The pole with its hot sleeve applied to it progressively passes through a cooler 34 which cools the surface of the plastic, and the pole is then received on an exit conveyor or puller 36.

Once the now sleeved pole moves beyond the cooler 34, the pole can be transferred to a storage platform 38 where it continues to cool and where it is available for movement, usually by a forklift, to another destination where it is to wait for shipment to a construction site.

The rate of advancement of the poles through the extruder is controlled by the speed controller 40. The speed controller communicates with the speed and diameter sensor 26 and adjusts the speed of the entrance conveyor 24 and the exit conveyor 36, with these conveyors usually operating at identical rates of speed.

FIG. 3 shows more details of some aspects of the process described above. The pusher or entrance conveyor 24 includes upper and lower belt conveyors 42 and 43 of rugged construction that are capable of handling the large size and weight of the timbers or pilings 20. The upper and lower belt conveyors are movable and adjustable during the processing of the poles so as to make sure that the longitudinal axis 44 of each pole is aligned with the extruder die 30 and the other elements of the processing path. Also, the upper and lower belt conveyors 42 and 43 are movable toward and away from each other so as to positively grip the poles and restrain the poles from undesired lateral movements.

As the poles are advanced by the conveyors 42 and 43 into the extruder die 30, they first pass through the speed and diameter sensor 26. FIG. 3 shows the speed and diameter sensor 26 as being a mechanical device, such as a wheel applied to the surface of the pole so that the wheel rotates in response to the movement of the pole. The rotational movement of the wheel is detected and is fed to the speed controller 40, and that information is then used to adjust the speeds of the entrance conveyor 24 and exit conveyor 36. The same or similar device is used to detect the thickness of the pole. This measurement is used to adjust the heights of the upper and lower entrance conveyors 42 and 43. While the speed controller 40 has been indicated as being a mechanical device, various optical devices are available for making speed and height detections and can be used in a similar manner to control the conveyors.

The speed and diameter sensors 26 are positioned at a known distance from extruder die 30 so that the portions of the pole measured by the speed and diameter sensors 26 are recorded and when each detected portion approaches the extruder die 30, the rate of advancement of the pole 20A is adjusted as may be necessary to accommodate for the pole decreasing in thickness or increasing in thickness, as described above.

The extruder die 30 is a circular die, having an opening 50 and the extruder 32 supplies molten plastic usually at a constant rate to the extruder die. The plastic is supplied by the die in a circular arrangement that is directed toward the cylindrical shape of the pole and as the pole is pushed through the die, it carries the plastic with it so that the plastic forms a sleeve about the cylindrical surface of the pole.

As the pole approaches the extruder 30, it passes through the vacuum box 28. the vacuum box includes a plurality of flexible seals 52 that seal the inside of the vacuum box about the pole. A blower 54 draws air from within the vacuum box to the outside so that the pressure of the atmosphere inside the vacuum box 28 is reduced. This tends to cause the pressure of the atmospheric air outside the vacuum box to be applied as indicated by arrow 56 into the exit of the vacuum box 28, thereby urging the plastic extruded from the extruder die 30 to be applied intimately with the surface of the portion of the pole moving through and just beyond the extruder die.

When the pole, such as pole 20B of FIG. 3, moves beyond the extruder 30, the pole progressively passes through the cooler 34. The cooler 34 applies chilled air to the exterior of the plastic sleeve that is now applied to the pole. A heat exchanger 60 chills the atmospheric air, blower 62 draws the air through the heat exchanger and delivers the air to the cooler 34 so that the flow of chilled air within the cooler 34 is applied aggressively to the hot plastic of the sleeve.

While chilled air is a good coolant, other fluids can be used, such as nitrogen gas and liquids such as sprayed water.

The extruder 32 heats the plastic so that when the plastic is applied to the pole it is in a molten state. The temperature of the plastic as it is extruded will vary with the kind of plastic, but the typical temperature would be about 350 degrees F. for polyvinyl chloride to assure that it is pliable enough to flow through the extruder die and to collapse on the surface of the pole and respond to the reduced pressure of the atmosphere within the vacuum box to achieve the intimate contact with the surface of the pole. However, it is also desirable to have the sleeve at a lower temperature when the sleeved pole 20B reaches the exit or pull conveyor 36 so that the plastic sleeve will not cling to or become excessively deformed by its contact with the exit conveyor. This lower temperature should be less than about 200 Degrees F. for polyvinyl chloride. Other high and low temperatures would be identified for other plastic materials.

As the series of poles progress beyond the extruder die 30, it is desirable to form the gathered portions of the sleeves about the ends of the poles. This should be done while the plastic material is still hot so that it clings to itself at the ends of the poles and provides a watertight seal about the poles. As shown in FIG. 3, a pair of oppositely moving gathering plates 60 reciprocate toward and away from each other, so that when the plates are spaced apart they form a passage therebetween as the body of each pole moves along the processing path. Once the trailing end 62 of a pole passes the position of the gathering plates 60 and before the leading end 64 reaches the gathering plates, the gathering plates are moved together between the poles, thereby forming the folded-in portions 16 (FIG. 1) at the adjacent ends of the poles. If desired, the gathering plates 60 can have a scissors movement and can have edges that are shaped for inducing the gathering and sealing of the plastic to itself, such as V-shapes. The reduced pressure created by the vacuum box 28 tends to collapse the span of the sleeve extending between the adjacent ends of the poles so that when the gathering plates urge the sleeve closed the air in the sleeve is evacuated, tending to cause the sleeve to make more intimate contact with the adjacent ends of the poles.

As previously stated, the poles, such as poles 20A and 20B, typically will be tapered along their lengths, with each pole having a big end and a small end. Usually, the poles will be loaded into the apparatus so that the big end of each pole is located adjacent the big end of the next adjacent pole, and with the small end of each pole located adjacent the small end of the next adjacent pole. With this loading process, the system usually will not have to make a radical adjustment of the rate of advancement of the poles along the processing path.

It is anticipated that some poles will have large ends that are too large for passing through the die of the extruder or have protruding splinters or protrusions from the removal of limbs that might not pass through the die. The larger portions of the pole are trimmed to a size to pass through the die. The trimming of the large portions of the poles can be done by conventional equipment prior to loading the poles on the entrance conveyor, or the trimmer can be used at the entrance conveyor.

Because the extruder 32 applies a constant volume of plastic to the extruder die 30, and because the diameter of the typical pole at the extruder die 30 is likely to progressively change, the rate of advancement of the pole may be adjusted to assure that a substantially constant thickness of plastic is applied to the pole by the extruder die, resulting in a substantially constant thickness of the sleeve formed about the pole.

Also, it may be desirable to raise and lower the conveyors 24 and 36 to accommodate radially different sized poles to handle thicker or thinner poles, or to raise or lower the conveyors during the processing of a single pole to accommodate for its thinner or thicker portions. In the alternative, it may be desired to adjust the position of the extruder die 30 in response to the position of the portion of the pole passing through it. In either instance, it is desirable to have the longitudinal axis of the pole 44 be coextensive with the components of the system, particularly with respect to the extruder die 30.

This process allows for the use of any type of wood and any type of preservative treatment of the wood, or no preservative at all. It has been found that southern yellow pine pressure treated poles with 0.8 to 2.5 pounds per cubic foot of chromated copper arsenic (CCA) can be effectively used in the system. Other poles and elongated structures can use this application process, to cover the poles with plastic, such as fiberglass, reinforced plastic, wood flour composites, steel, aluminum, etc. A wide range of plastics also can be used to sleeve the timber, depending on the end use of the product. Certain plastics have better resistance to certain chemicals, for example, and other may have better weatherability. The end use will dictate the performance requirements and, therefore, the properties of the plastic to be utilized. Successful plastics utilized today include polyvinylchloride, polypropylene, polyethylene, as well as several copolymers.

The plastic sleeve is intimately applied to the surface of the core product, such that it tends to cling on its own accord to the product, and it takes on a shape of the core product, such as conforming to the exposed grain of the wooden pole.

The reduction in pressure of the atmosphere inside the vacuum box may be adjustable so as to optimize the rate of movement of the plastic against the surface of the pole. The larger the distance between the plastic and the pole, the greater the need for more pressure differential. For example, a pressure differential of as low as two pounds per square inch can induce the intimate contact of the plastic to the portion of the pole passing through the extruder die if the distance of movement of the plastic is less than about one inch. However, as the distance of movement of the plastic into contact with the pole increases, up to as much as 15 to 20 pounds per square inch of pressure differential may be required. In addition, the viscosity of the plastic, depending on the type of plastic and the temperature of the plastic, has some effect on the pressure differential required in the process.

While the process has been described as applying to poles having varying cross sectional area along their lengths, the process can be applied to poles that have long lengths of constant cross sectional area, to timbers or other objects that are of substantially constant cross sectional area along their entire lengths, without the necessity of varying the rate of advancement of the object.

Although a preferred embodiment of the invention has been disclosed in detail herein, it will be obvious to those skilled in the art that variations and modifications of the disclosed embodiment can be made without departing from the spirit and scope of the invention as set forth in the following claims.

Therefore, having thus described the invention, at least the following is claimed:

1. A process of applying a plastic sleeve to a pole of varying cross sectional area, comprising:
    advancing a plurality of substantially rectilinear poles of varying cross sectional area along their lengths in series along a processing path through the opening of an extruder die,
    feeding a plastic material at substantially a constant rate to the extruder die,
    continuously applying the plastic material through the opening of the extruder die about the exterior surface of each pole as each pole moves through the extruder die and progressively surrounding the pole with the plastic,
    detecting the thickness of a portion of the pole at a position displaced upstream of the extruder die,
    as the detected portion of the pole enters the extruder die increasing the rate of advancement of the pole in response to the detected portion of the pole decreasing in thickness and decreasing the rate of advancement of the pole in response to the detected portion of the pole increasing in thickness, and
    wrapping the plastic about the trailing end of the pole as the trailing end of the pole moves away from the extruder die.

2. The process of claim 1, wherein the step of wrapping the plastic about the trailing end of the pole comprises applying an area of reduced pressure between the plastic and the trailing end of the pole such that the plastic being applied by the extruder die to the trailing end of the pole is induced to move about the trailing end of the pole.

3. The process of claim 1, wherein the step of wrapping the plastic about the trailing end of the pole comprises:
    as the trailing end of a pole moves beyond the extruder die, gathering together the plastic extending from the die to the trailing end of the pole.

4. The process of claim 1, wherein the step of wrapping the plastic about the trailing end of the pole comprises mechanically gathering the plastic extending from the trailing end of the pole and cutting through the gathered plastic.

5. The process of claim 4, wherein the step of mechanically gathering the plastic extending from the die to the trailing edge of the pole and cutting through the gathered plastic comprises:
    forming a closed end of the plastic for receiving the oncoming leading end of the next pole in the series of poles, and
    cutting the gathered plastic between the poles to separate the poles.

6. The process of claim 1, wherein the step of advancing the plurality of poles comprises:
    advancing the poles at a rate corresponding to the variable thickness of the poles to apply a uniform thickness of plastic about the poles.

7. The process of claim 1, and further including the step of:
    maintaining the longitudinal axes of the detected portion of the poles substantially co-extensive with the longitudinal axis of the extruder die as the detected portion of the poles pass through the die.

8. A process of applying plastic sleeves of substantially constant thickness about poles of varying cross sectional area, comprising:
    advancing a plurality of substantially rectilinear poles of varying cross sectional areas along their lengths in series along a processing path through the opening of an extruder die,
    feeding a plastic material at substantially a constant rate to the extruder die,
    continuously applying the plastic material through the opening of the extruder die about the exterior surface of each pole as each pole moves through the extruder die and progressively surrounding the pole with the plastic,
    detecting the thickness of a portion of each pole at a position displaced upstream of the extruder die,
    as the detected portion of each pole enters the extruder die increasing the rate of advancement of the pole in response to the detected portion of the pole decreasing in thickness and decreasing the rate of advancement of the pole in response to the detected portion of the pole increasing in thickness,
    applying a substantially constant thickness of plastic material on the exterior surface along the length of each pole, and
    lifting the detected portions of the poles as the poles become thinner and lowering the detected portions of the poles as the poles become thicker to maintain the longitudinal axes of the detected portions of the poles substantially co-extensive with the longitudinal axis of the extruder die.

9. A process of applying a plastic sleeve to a series of poles each of varying cross sectional area, comprising:

advancing a plurality of substantially rectilinear poles along their lengths in series along a processing path through the opening of an extruder die, feeding a plastic material at substantially a constant rate to the extruder die, continuously forming a sleeve of the plastic material through the opening of the extruder die, progressively applying the sleeve of the plastic material about the exterior surface of each pole as each pole moves through the extruder die, detecting the thickness of a portion of each pole at a position displaced upstream of the extruder die, adjusting the rate of advancement of each pole through the extruder die to correspond to the thickness of the detected portion of each pole passing through the extruder die to apply a uniform thickness of plastic in the sleeve about the poles, and wrapping the ends of the poles with the plastic sleeve.

10. The process of claim 9, wherein the step of wrapping the ends of the pole with the plastic material comprises extending the extruded sleeve beyond the end of the poles that have passed through the extruder die and closing the extended portion of the sleeve about the end of the pole without severing the sleeve, and continuing the extrusion of the sleeve about the leading end of the oncoming pole, severing the sleeve where the sleeve is closed between the poles to form a closed end of the sleeve at the trailing edge of one pole and a closed end of the sleeve at the leading end of the next oncoming pole.

11. The process of claim 9, wherein the step of feeding plastic material to the extruder die comprises feeding a plastic material selected from the group consisting essentially of: polyvinyl chloride, polypropylene, and polyethylene.

12. The process of claim 11, and further including the step of heating the plastic material before the plastic material is fed to the extruder die, and progressively cooling the sleeve after the sleeve has been applied to the pole.

13. The process of claim 12, wherein the step of heating the plastic comprises heating the plastic to a temperature above about 350 degrees Fahrenheit and the step of cooling the sleeve comprises applying a coolant to the sleeve until the temperature of the outer surface of the plastic sleeve is lower than about 200 degrees Fahrenheit.

14. The process of claim 9, wherein the step of advancing a series of poles comprises moving the poles with an entrance conveyor toward the extruder die and moving the poles with an exit conveyor away from the extruder die, and cooling the sleeve applied to the pole at a position between the extruder die and the exit conveyor.

15. The process of claim 14, wherein the step of cooling the sleeve applied to the pole comprises cooling the sleeve to a temperature below about 200 degrees Fahrenheit before the sleeve contacts the exit conveyor.

16. The process of claim 9, wherein the step of advancing a series of poles comprises:

the poles have one small end and one large end, with the small end of each pole being smaller than its large end, and the step of advancing the poles in series comprises advancing each pole with the small end of each pole adjacent the small end of the next adjacent pole.

17. A process of applying plastic sleeves to a series of poles, comprising:

advancing a plurality of substantially rectilinear poles along their lengths in series along a processing path through the opening of an extruder die, feeding a plastic material at substantially a constant rate to the extruder die, continuously forming a sleeve of the plastic material through the opening of the extruder die, progressively applying the sleeve of the plastic material about the exterior surface of each pole as each pole moves through the extruder die, adjusting the rate of advancement of each pole through the extruder die to correspond to the thickness of the pole passing through the extruder die to apply a uniform thickness of plastic in the sleeves formed about the poles, and wrapping the ends of the poles with the plastic sleeve.

18. The process of claim 17, wherein the step of wrapping the ends of the pole with the plastic comprises extending the extruded sleeve beyond the end of the pole that has passed through the extruder die and closing the extended portion of the sleeve about the end of the pole without severing the sleeve, and continuing the extrusion of the sleeve about the leading end of the oncoming pole, severing the sleeve where the sleeve is closed between the poles to form a closed end of the sleeve at the trailing edge of one pole and a closed end of the sleeve at the leading end of the next on-coming pole.

19. The process of claim 17, wherein the step of feeding plastic material to the extruder die comprises feeding a plastic material selected from the group consisting essentially of: polyvinyl chloride, polypropylene, and polyethylene.

20. The process of claim 19, and further including the step of heating the plastic material before the plastic material is fed to the extruder die, and progressively cooling the sleeve after the sleeve has been applied to the pole.

21. The process of claim 17, wherein the step of advancing a series of poles comprises moving the poles with an entrance conveyor toward the extruder die and moving the poles with an exit conveyor away from the extruder die, and cooling the sleeve applied to the pole at a position between the extruder die and the exit conveyor.

22. The process of claim 17, wherein the step of advancing a series of poles comprises:

the poles have one small end and one large end, with the small end of each pole being smaller than its large end, and the step of advancing the poles in series comprises advancing each pole with the small end of each pole adjacent the small end of the next adjacent pole.

\* \* \* \* \*